US006599589B1

(12) United States Patent
Iwamatsu et al.

(10) Patent No.: US 6,599,589 B1
(45) Date of Patent: Jul. 29, 2003

(54) LIQUID CRYSTAL COMPOSITION AND LIQUID CRYSTAL LIGHT DISPLAY ELEMENT USING THE SAME

(75) Inventors: Masako Iwamatsu, Toyonaka (JP); Nobuyuki Kobayashi, Kobe (JP); Hideaki Ueda, Kishiwada (JP)

(73) Assignee: Minolta Co., Ltd., Osaka (JP)

( * ) Notice: Subject to any disclaimer, the term of this patent is extended or adjusted under 35 U.S.C. 154(b) by 130 days.

(21) Appl. No.: 09/669,978

(22) Filed: Sep. 26, 2000

(30) Foreign Application Priority Data

Sep. 30, 1999 (JP) .......................................... 11-279501

(51) Int. Cl.[7] ......................... C09K 19/20; C09K 19/12

(52) U.S. Cl. .............. 428/1.1; 252/299.64; 252/299.65; 252/299.66; 252/299.67

(58) Field of Search ....................... 252/299.66, 299.63, 252/299.64, 299.65, 299.67; 428/1.1

(56) References Cited

U.S. PATENT DOCUMENTS

| | | | | |
|---|---|---|---|---|
| 5,156,763 A | | 10/1992 | Gray et al. | 252/299.67 |
| 5,755,994 A | | 5/1998 | Kondo et al. | 252/299.61 |
| 6,274,208 B1 | * | 8/2001 | Iwamatsu et al. | 428/1.1 |
| 6,287,647 B1 | * | 9/2001 | Kobayashi et al. | 428/1.1 |
| 6,348,961 B2 | * | 2/2002 | Iwamatsu et al. | 349/175 |
| 6,416,825 B1 | * | 7/2002 | Kobayashi et al. | 428/1.1 |
| 6,461,693 B1 | * | 10/2002 | Iwamatsu et al. | 428/1.1 |

FOREIGN PATENT DOCUMENTS

| | | | |
|---|---|---|---|
| JP | 10-245560 A | | 9/1998 |
| JP | 2000-63838 | * | 2/2000 |

* cited by examiner

*Primary Examiner*—Shean C. Wu
(74) *Attorney, Agent, or Firm*—Sidley Austin Brown & Wood LLP

(57) ABSTRACT

Disclosed is a chiral nematic liquid crystal composition including a nematic liquid crystal composition and a chiral agent. The nematic liquid crystal composition comprises at least one type of liquid crystal ester compound including an ester unit and at least two fluorine atoms therein; and at least one type of liquid crystal tolan compound including a tolan unit therein. By selecting these liquid crystal compounds, a chiral nematic liquid crystal composition having a broad temperature compensation range and a low drive voltage can be realized.

20 Claims, 4 Drawing Sheets

LIQUID CRYSTAL COMPOSITION AND LIQUID CRYSTAL LIGHT DISPLAY ELEMENT USING THE SAME

CROSS-REFERENCE TO RELATED APPLICATION

This application is based on Japanese Patent Application No. HEI 11-279501 filed on Sep. 30, 1999 in Japan, the entire content of which is hereby incorporated by reference.

BACKGROUND OF THE INVENTION

1. Field of the Invention

The present invention relates to a liquid crystal composition exhibiting a cholesteric phase at room temperature. The present invention also relates a liquid crystal display element having a light control layer including the liquid crystal composition retained between a pair of substrates at least one of which is transparent. Specifically, the present invention relates to a liquid crystal display element of the reflecting type used for switching between two stable states (bistable switching) by a light control layer including the liquid crystal composition.

2. Description of the Related Art

There have been various researches in recent years into liquid crystal display elements of the reflective type using chiral-nematic liquid crystal expressing a cholesteric phase at room temperature by adding a chiral agent to a nematic liquid crystal.

Heretofore, liquid crystal display elements of the reflective type using a chiral nematic liquid crystal composition have not been able to be driven at low voltage while keeping display characteristics such as reflectivity under the planer state, contrast between the planar state and focal-conic state, color purity (excitation purity), and so on. Furthermore, it is important that this type of liquid crystal display element has a broad operational temperature range (temperature compensation range).

SUMMARY OF THE INVENTION

To resolve the previously mentioned disadvantages, a main object of the present invention is to provide an improved liquid crystal composition and reflective type liquid crystal display element using the same.

Another object of the present invention is to provide a liquid crystal composition and a liquid crystal display element of the reflective type having a broad temperature compensation range and a low drive voltage.

The present inventors investigated various compositions of liquid crystal materials to attain these objects, and as a result discovered the efficacy of using a liquid crystal including a liquid crystal ester compound having large dielectric anisotropy for realizing a low drive voltage, and particularly having a CN group at the terminal group and/or a fluorine atom within the molecular structure. The liquid crystal ester compound generally has a high viscosity that is disadvantageous from the perspective of responsiveness. The problem of high viscosity occurs particularly in liquid crystal compounds including more than 10% chiral agent. Furthermore, liquid crystal ester compounds generally have small refractive index anisotropy, and cannot produce adequate contrast. In order to resolve these problems, the inventors of the present invention discovered the advantage of adding liquid crystal tolan compounds having low viscosity and high refractive index anisotropy. Liquid crystal tolan compounds also have high transition temperatures and broad temperature compensation ranges. Furthermore, liquid crystal phenylcyclohexane compound possesses both stability and markedly low viscosity, and it was discovered that adding this compound improved reliability of the entire liquid crystal compound. Compounds having a cyano group as the terminus in particular have been confirmed as increasing the breadth of the temperature compensation range. These studies have resulted in the present invention.

That is, according to one aspect of the present invention, a chiral nematic liquid crystal composition that exhibits a cholesteric phase comprises a nematic liquid crystal composition and a chiral agent having an optical activity. The nematic liquid crystal composition is defined to comprise at least one type of liquid crystal ester compound that includes an ester unit and at least two fluorine atoms therein, and at least one type of liquid crystal tolan compound including a tolan unit therein.

The chiral nematic liquid crystal composition is preferably regulated by adding a chiral agent to the nematic liquid crystal in an amount sufficient to effectively form a planer structure. The chiral agent is more preferably added to the nematic liquid crystal in an amount sufficient to effectively form a focal-conic structure.

The chiral agent may be included in a range from 10 wt% to 45 wt% relative to the total weight of the nematic liquid crystal composition and chiral agent.

The nematic liquid crystal composition also may include at least one type of liquid crystal tricyclic compound. The inclusion of a liquid crystal tricyclic compound improves the usable temperature range of the chiral nematic liquid crystal composition. The liquid crystal tricyclic compound used may have a cyano group at the terminus. Furthermore, a compound having at least one fluorine atom in its molecular structure may be used.

The total content of the at least one type of liquid crystal ester compound and the at least one type of liquid crystal tolan compound may be 60 wt% or more relative to the nematic liquid crystal composition.

The liquid crystal ester compound included may be 25 wt% or more relative to the nematic liquid crystal composition. The liquid crystal ester compound used will have a cyano group at its terminus.

The liquid crystal tolan compound content may be at least 15 wt% relative to the nematic liquid crystal composition. The liquid crystal tolan compound used has at least one fluorine atom within its molecular structure.

The dielectric anisotropy of the chiral nematic liquid crystal composition is in a range from 9 to 40, and desirably in a range from 15 to 40.

The refractive index anisotropy of the chiral nematic liquid crystal composition is in a range from 0.10 to 0.25, and desirably in a range from 0.14 to 0.22. The chiral nematic liquid crystal composition may include colorant.

According to another aspect of the present invention, a liquid crystal display comprises: a pair of substrates at least one of which is transparent; and a liquid crystal layer retained between said substrates, said liquid crystal layer including the above mentioned chiral nematic liquid crystal composition.

BRIEF DESCRIPTION OF THE DRAWINGS

These and other objects, advantages and features of the invention will become apparent from the following description thereof taken in conjunction with the accompanying drawings, in which.

DETAILED DESCRIPTION OF THE PREFERRED EMBODIMENTS

The embodiments of the liquid crystal display element of the present invention are described hereinafter with reference to the accompanying drawings.

First Embodiment: Structure and Display Operation

Figure 1A:
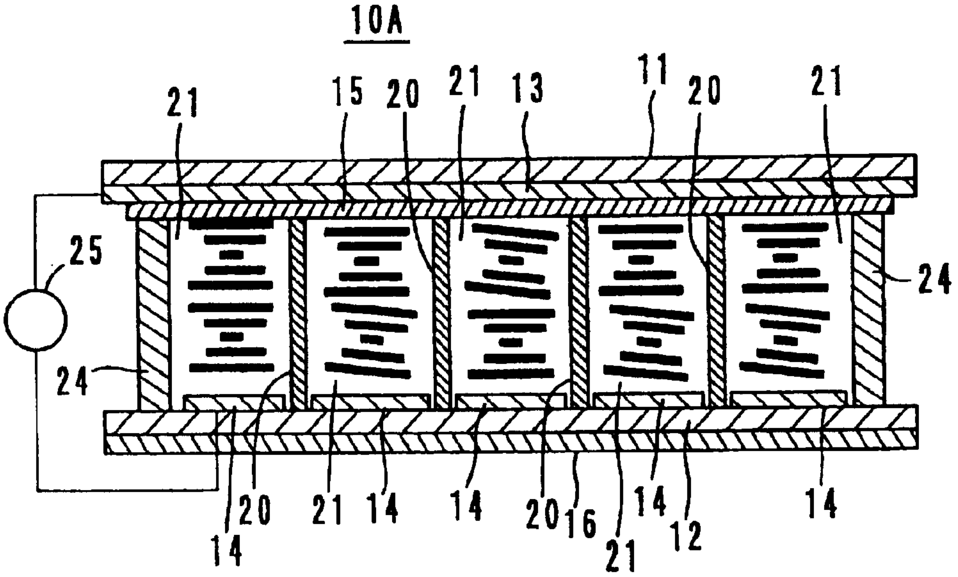
FIGS. 1(A) and (B) show the cross sectional structure of the liquid crystal element of a first embodiment of the present invention.
Figure 1B:
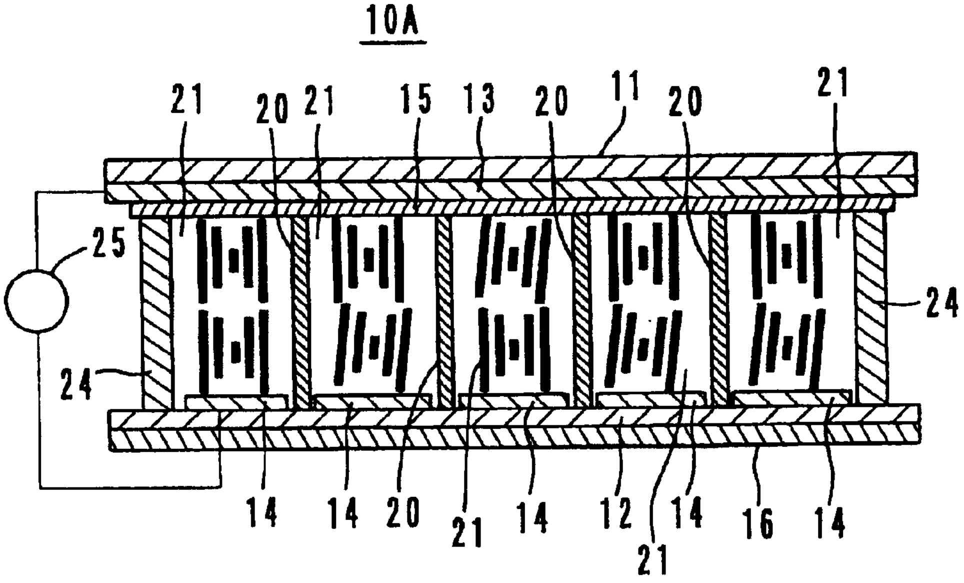

FIGS. 1(A) and 1(B) show the cross sectional structure of the liquid crystal display element 10A reflecting a first embodiment of the present invention. FIG. 1(A) shows the planar state (selective reflection color state) when a high voltage pulse is applied, and FIG. 1(B) shows the focal-conic state (transparent/black display state) when a low voltage pulse is applied. This liquid crystal display element has memory effect, and the planar state or focal-conic state is maintained even after the application of the pulse voltage is terminated.

In FIGS. 1(A) and 1(B), reference numbers 11 and 12 refer to transparent substrates on the respective surfaces of which are formed matrix-like transparent electrodes 13 and 14. It is desirable that an insulating thin layer 15 is formed over the electrode 13. A visible light absorption layer 16 is provided on the surface of the substrate 12 in accordance with display requirements.

Reference number 20 refers to a columnar structure, and 21 refers to a chiral nematic liquid crystal composition exhibiting a cholesteric phase at room temperature; these materials and their combination are described in detail in the examples below. Reference number 24 refers to a seal member used to seal the liquid crystal composition 21 between the substrates 11 and 12. Reference number 25 refers to a pulse power source for applying a specific pulse-like voltage between the electrodes 13 and 14.

In the liquid crystal display element having the aforesaid structure, display is accomplished by applying a pulse voltage from the power source 25 to the electrodes 13 and 14. That is, when a composition exhibiting a cholesteric phase and having bistability is used as the liquid crystal composition, the chiral nematic liquid crystal enters a planar state by the application of a relatively high pulse voltage, and light is selectively reflected based on the refractive index and cholesteric pitch. The liquid crystal enters a focal-conic state and becomes transparent by the application of a relatively low pulse voltage. As shown in FIGS. 1(A) and 1(B), when a visible light absorption layer 16 is provided, a black color is displayed in the focal-conic state.

In this liquid crystal display element, each region of intersection of the matrix-like electrodes 13 and 14 becomes the display pixel. In the present specification, the area of light modulation by the liquid crystal (i.e., the area occupied by the pixels) is referred to as the display area, and the periphery of this display area is outside the display area and is not subject to light modulation.

Substrate

At least one of the substrates 11 and 12 must be transparent. Flexible substrates other than glass, e.g., polycarbonate, polyether sulfone, polyethylene terephthalate and the like may be used as a transparent substrate.

Electrode

The electrodes 13 and 14 may be a transparent conductive film such as ITO (indium tin oxide); a metal electrode such as aluminum, silicon and the like; or a photoconductive film such as amorphous silicon, BSO (bismuth silicon oxide) and the like. The formation of the electrodes 13 and 14 in a matrix may be accomplished by, for example, forming an ITO film on the substrates 11 and 12 using a spattering method, and thereafter forming a pattern using a photolithographic method. A plurality of TFT may be used as switching elements.

Insulating Film, Orientation Film

The insulating thin film 15 is an inorganic film such as silicon oxide and the like, or an organic film such as polyimide resin, epoxy resin and the like; and finctions to prevent short circuiting of the electrodes 13 and 14, and to improve the reliability of the liquid crystal as a gas barrier layer. An orientation film of which polyimide resin is representative may be provided as necessary on the electrodes 13 and 14. The insulating film and the orientation film may be made of the same materials as the macromolecular body used for the columnar structure 20.

Spacer

Although they are not shown in FIGS. 1(A) and 1(B), spacers may be provided between the substrates 11 and 12. Each spacer is a spherical body formed of resin or inorganic oxide, and maintains a fixed gap between the substrates 11 and 12.

Chiral Nematic Liquid Crystal Composition

The chiral nematic liquid crystal composition in this embodiment includes a liquid crystal ester compound including at least two fluorine atoms, a liquid crystal tolan compound, and an added chiral agent. This chiral nematic liquid crystal composition comprises a chiral nematic liquid crystal that exhibits a cholesteric phase at room temperature. Colorant and/or ultraviolet absorption agents may be added to the chiral nematic liquid crystal composition. A liquid crystal tricyclic compound also may be included.

The liquid crystal ester compound including two or more fluorine atoms desirably has a CN group, and the content of this compound is desirably 25 wt% or greater. The liquid crystal tolan compound content is desirably 5 wt% or greater. The combined liquid crystal ester compound and liquid crystal tolan compound content is desirably 60 wt%.

The liquid crystal composition is prepared so as to achieve a desired selective reflection wavelength. The adjustment of the selective reflection wavelength may be changed by, for instance, the amount of added chiral agent. In general, when the amount of added chiral agent is increased, the selective reflection wavelength is shifted to the short wavelength side. Furthermore, the selective reflection wavelength is the peak wavelength in the visible light range of the reflection light spectrum when a pulse voltage has been applied to the electrodes 13 and 14 and the liquid crystal has attained a planar state.

The general formulas (A) and (A') of the usable liquid crystal ester compound and specific examples (A1) through (A76), and (A'1) through (A'30) are described below.

(A)

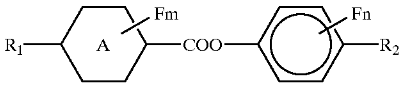

(A')

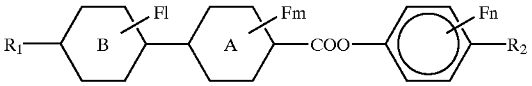

$R_1$ is an alkyl group, alkoxyl group, or alkenyl group having a carbon number from 1 to 10. $R_2$ is an alkyl group, alkoxyl group, or alkenyl group having a carbon number from 1 to 10, or a cyano group, or a fluorine atom. Each of A and B is a 1,4-phenylene group or a 1,4-cyclohexyl group. Each of 1, m, and n is an integer in the range of 0 to 4, wherein 1+m+n>2 (when $R_2$ is not a fluorine atom), and 1+m+n>1 (when $R_2$ is a fluorine atom).

(A1)

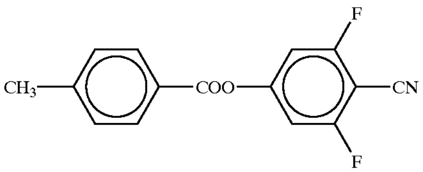

(A2)

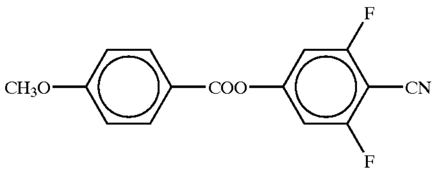

(A3)

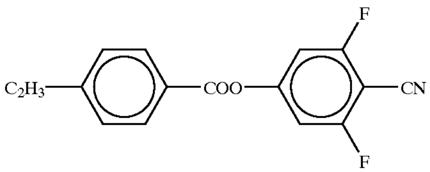

(A4)

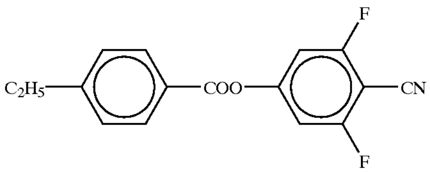

(A5)

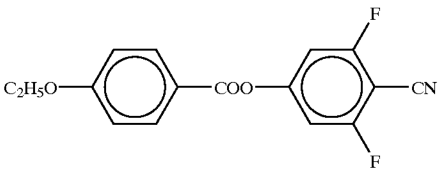

(A6)

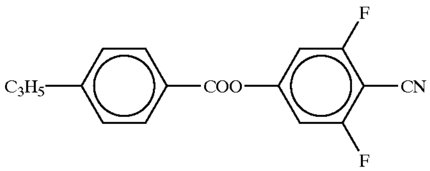

-continued (A7)

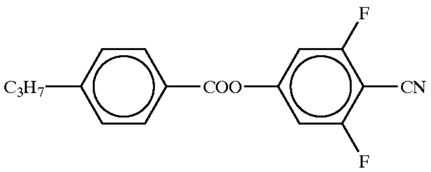

(A8)

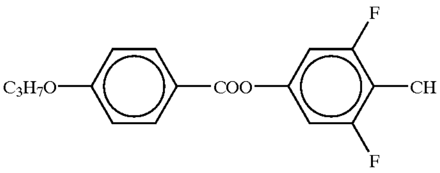

(A9)

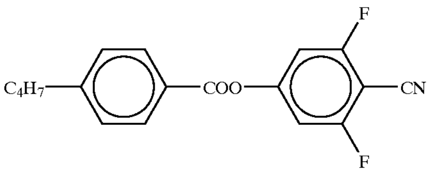

(A10)

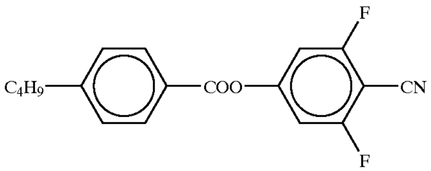

(A11)

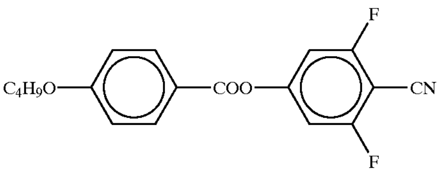

(A12)

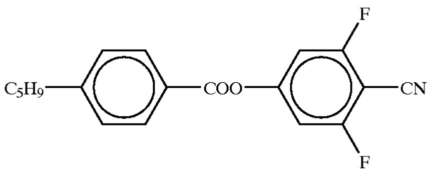

(A13)

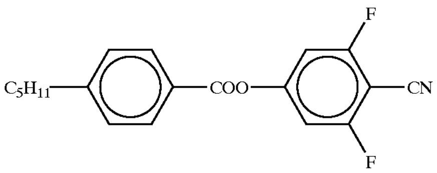

(A14)

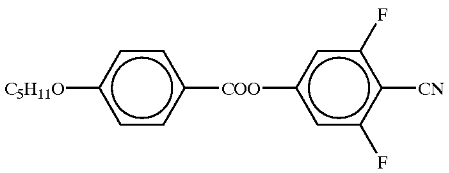

(A15)

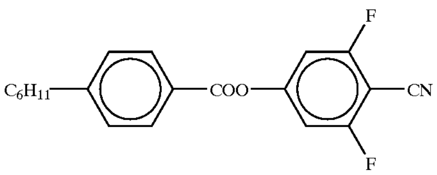

-continued
(A16)
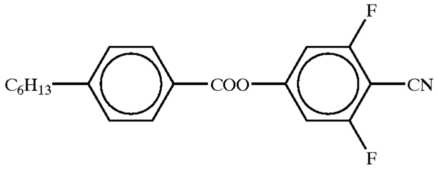
(A17)
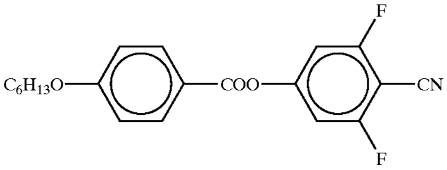
(A18)
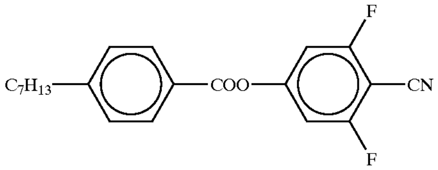
(A19)
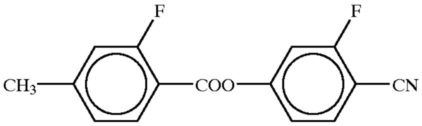
(A20)
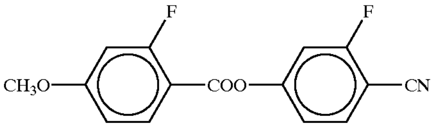
(A21)
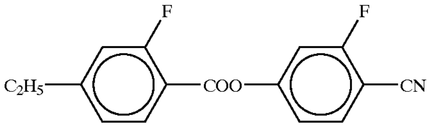
(A22)
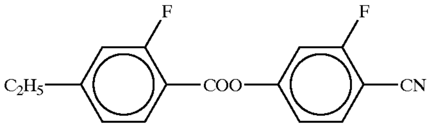
(A23)
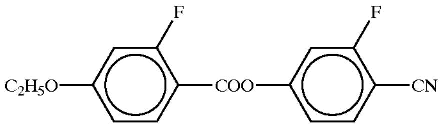
(A24)
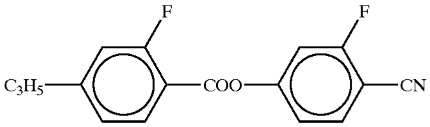
(A25)
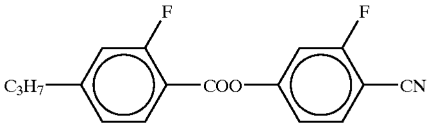
-continued
(A26)
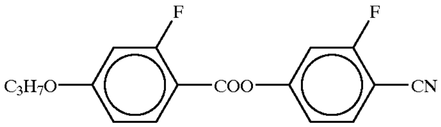
(A27)
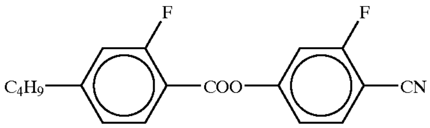
(A28)
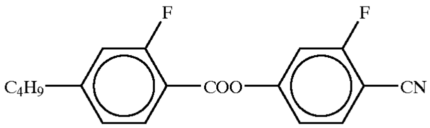
(A29)
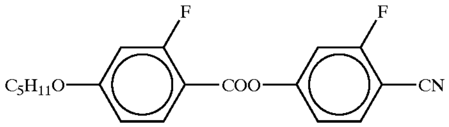
(A30)
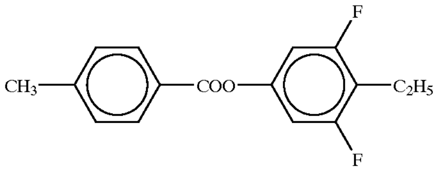
(A31)
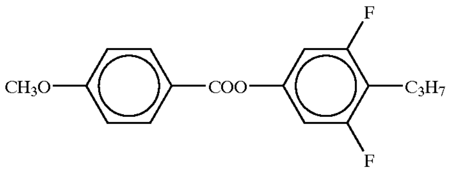
(A32)
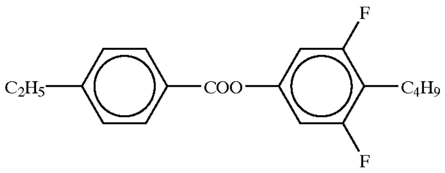
(A33)
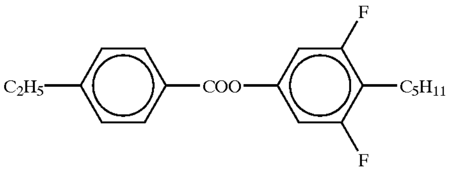
(A34)
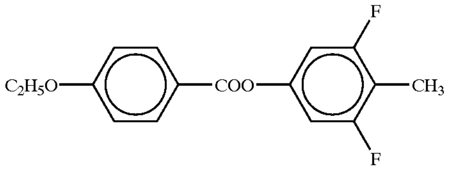
(A35)
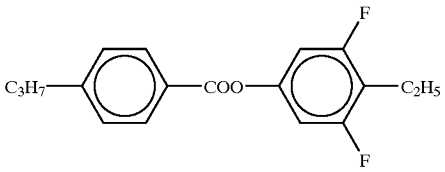

-continued
(A36)
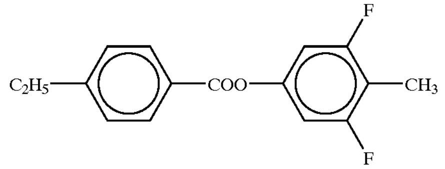
(A37)
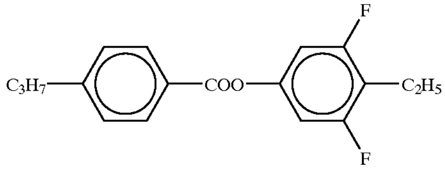
(A38)
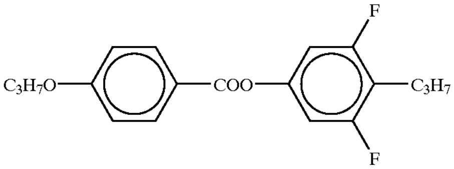
(A39)
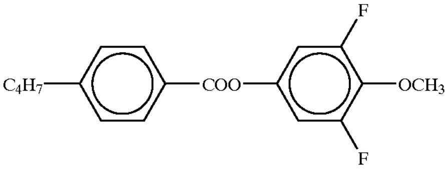
(A40)
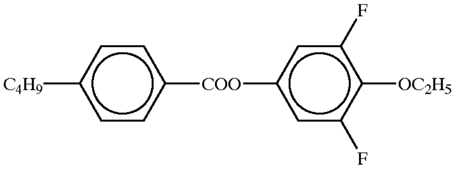
(A41)
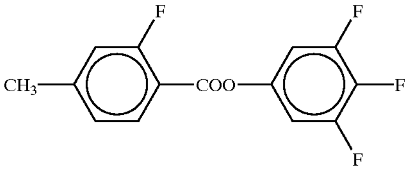
(A42)
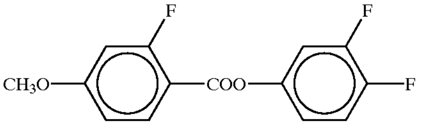
(A43)
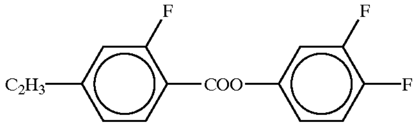
(A44)
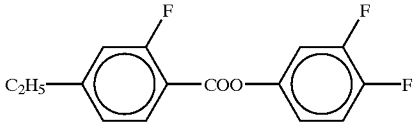
(A45)
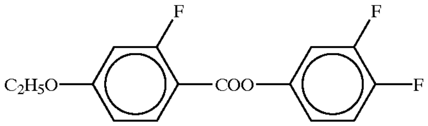
-continued
(A46)
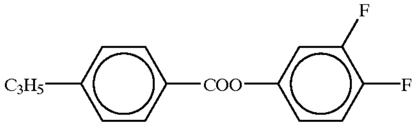
(A47)
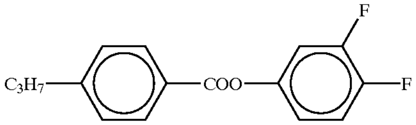
(A48)
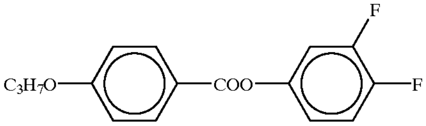
(A49)
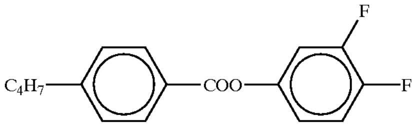
(A50)
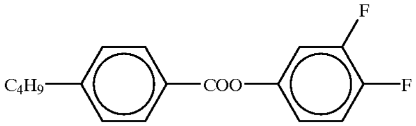
(A51)
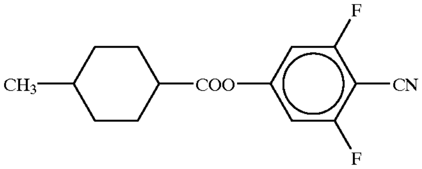
(A52)
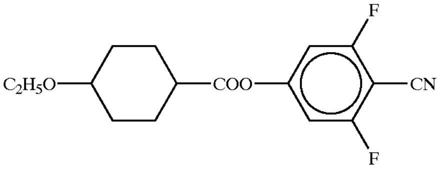
(A53)
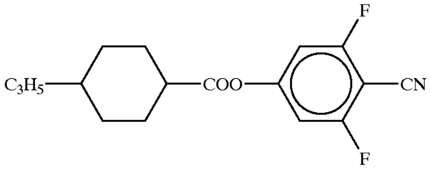
(A54)
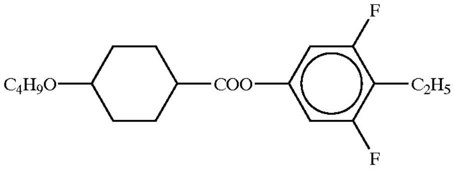
(A55)
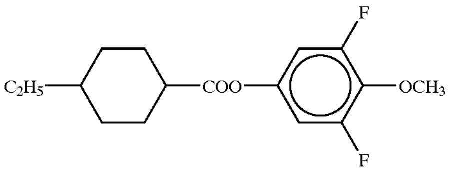

-continued
(A56)
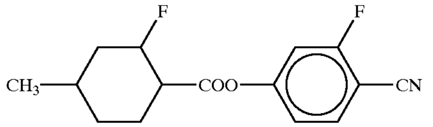
(A57)
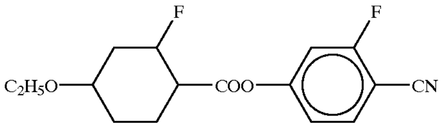
(A58)
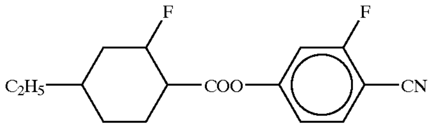
(A59)
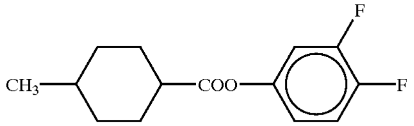
(A60)
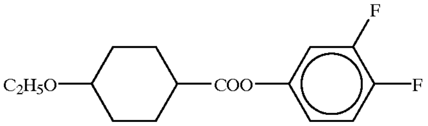
(A61)
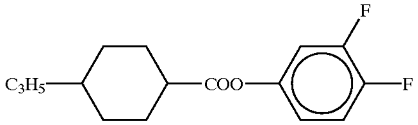
(A62)
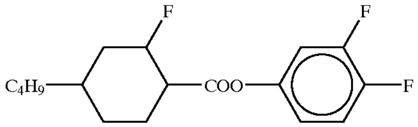
(A63)
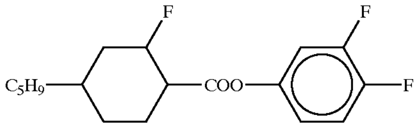
(A64)
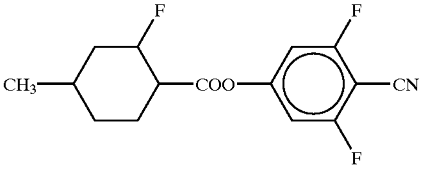
(A65)
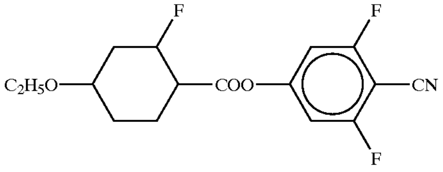
-continued
(A66)
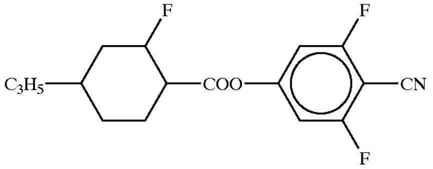
(A67)
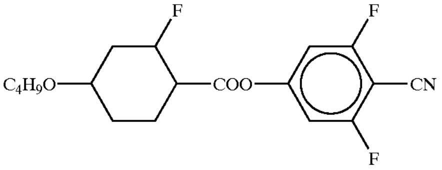
(A68)
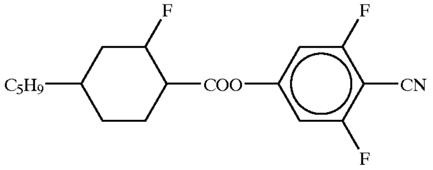
(A69)
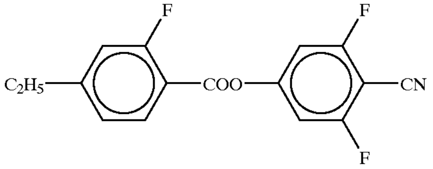
(A70)
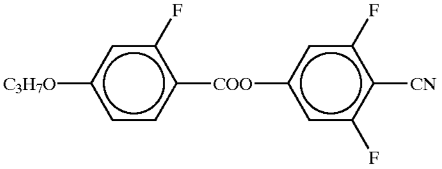
(A71)
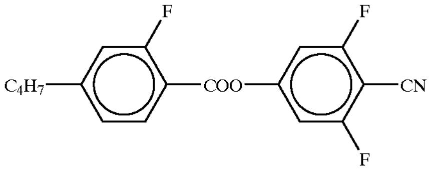
(A72)
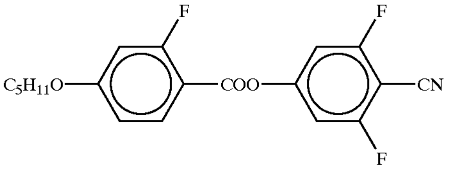
(A73)
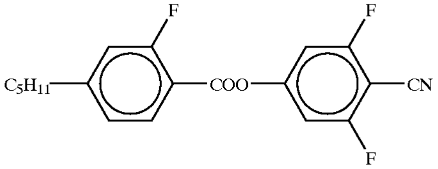
(A74)
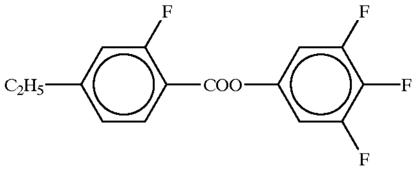

-continued
(A75)
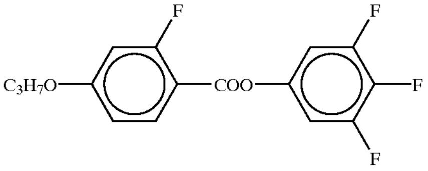
(A76)
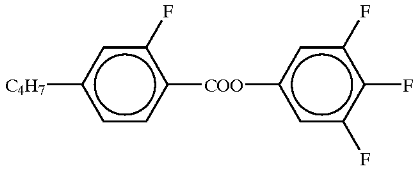
(A′1)
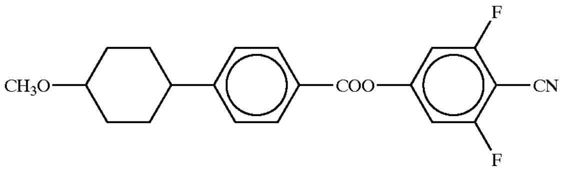
(A′2)
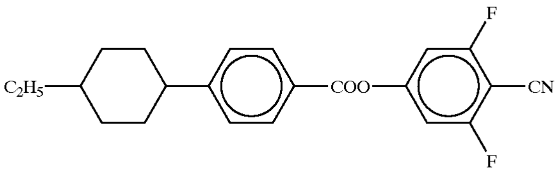
(A′3)
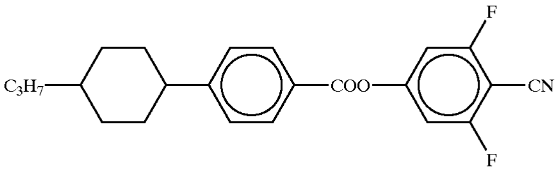
(A′4)
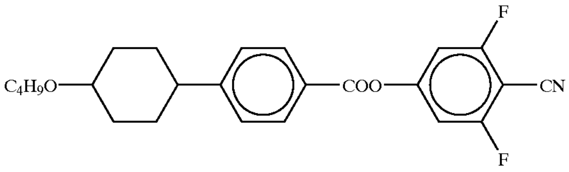
(A′5)
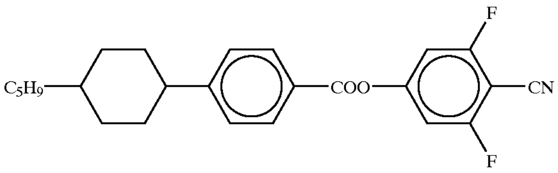
(A′6)
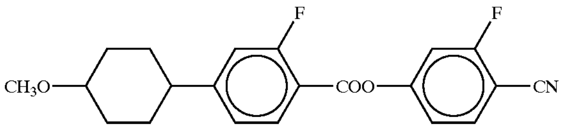
-continued
(A′7)
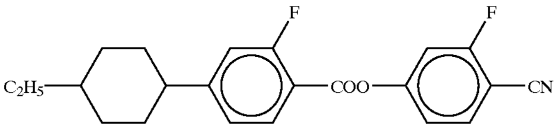
(A′8)
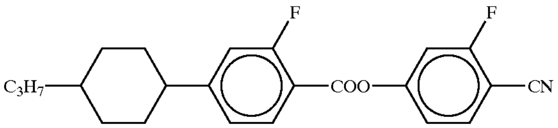
(A′9)
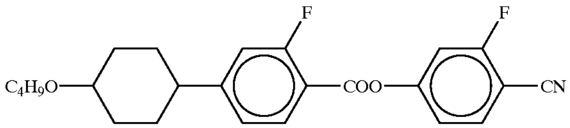
(A′10)
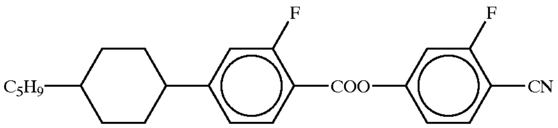
(A′11)
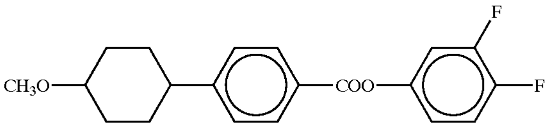
(A′12)
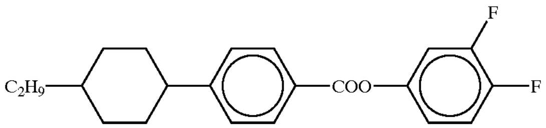
(A′13)
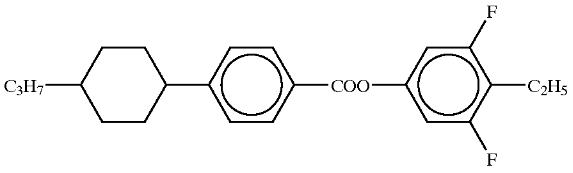
(A′14)
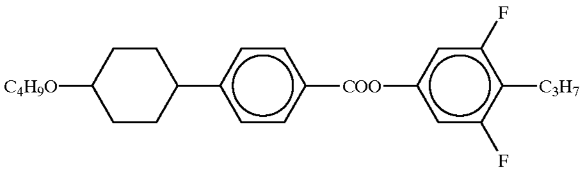
(A′15)
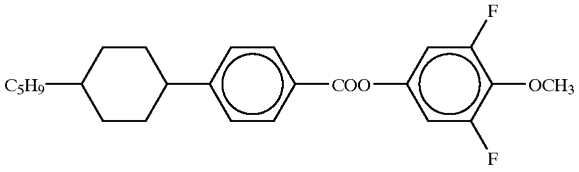

-continued (A'16)

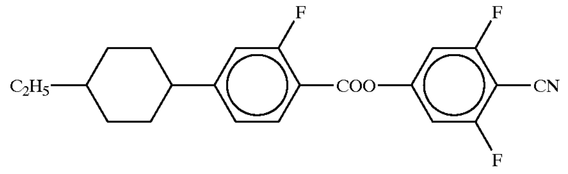

(A'17)

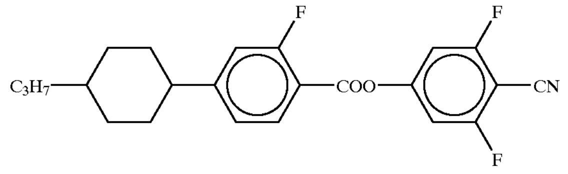

(A'18)

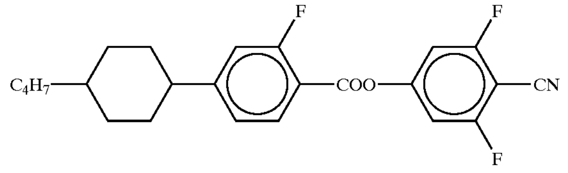

(A'19)

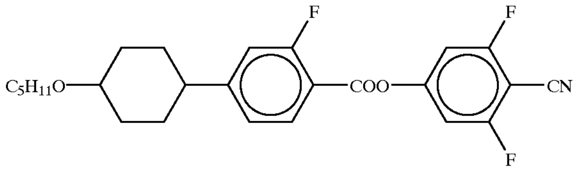

(A'20)

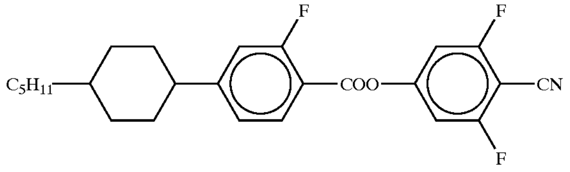

(A'21)

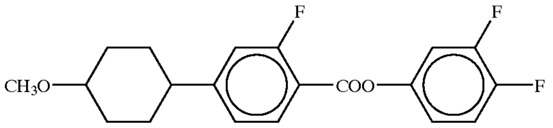

(A'22)

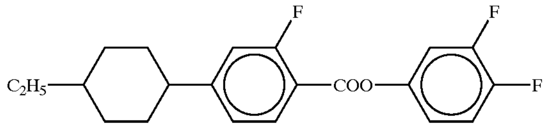

(A'23)

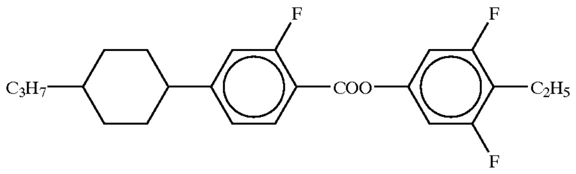

-continued (A'24)

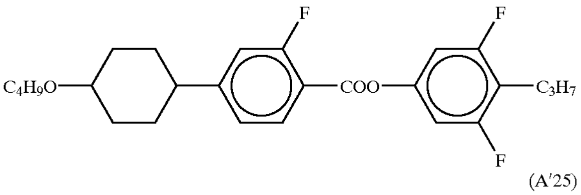

(A'25)

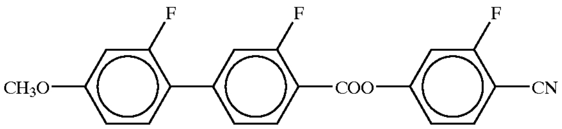

(A'26)

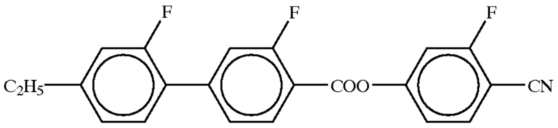

(A'27)

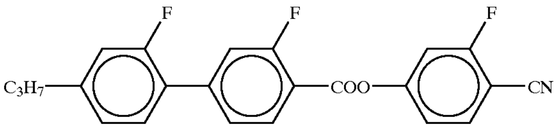

(A'28)

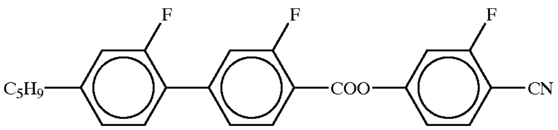

(A'29)

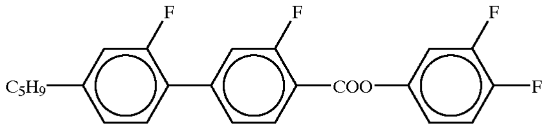

(A'30)

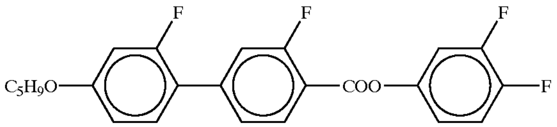

It is desirable that the liquid crystal ester compound used has a cyano group at its terminus. The liquid crystal ester compound is desirably contained in the chiral nematic liquid crystal composition at an amount of 25 wt% or more, more desirably 30 wt%, further more desirably 40 wt% or more. The upper limit of the liquid crystal ester compound content is 70 wt%, and is more desirably 60 wt%.

The general formula (B) of the usable liquid crystal tolan compound and specific examples (B1) through (B75) are provided below.

(B)

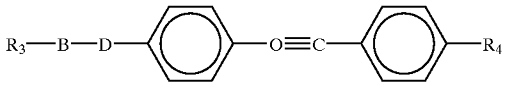

$R_3$ is an alkyl group, alkoxyl group or alkenyl group having a carbon number from 1 to 8. R4 is an alkyl group, alkoxyl group or alkenyl group having a carbon number from 1 to 8, or a fluorine atom. Each of B and D is a phenylene group or a cyclohexyl group, or a single bond.
(B1)
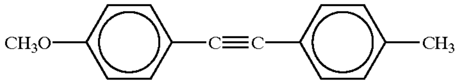
(B2)
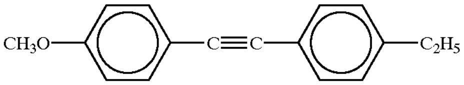
(B3)
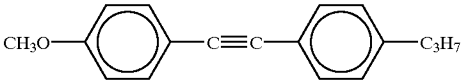
(B4)
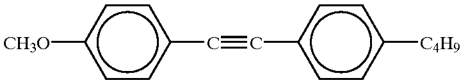
(B5)
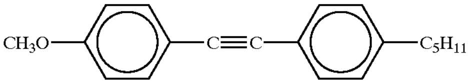
(B6)
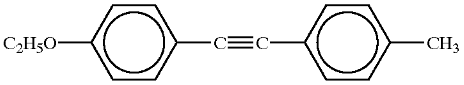
(B7)
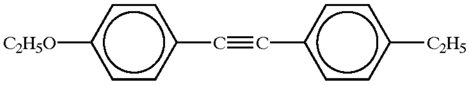
(B8)
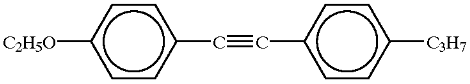
(B9)
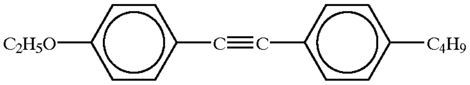
(B10)
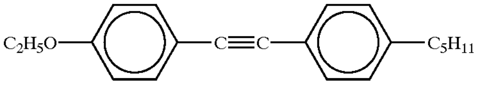
(B11)
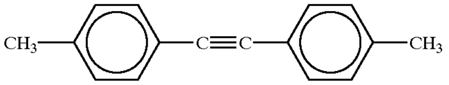
(B12)
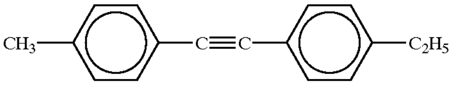
(B13)
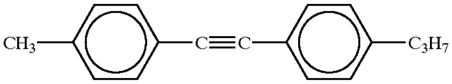
(B14)
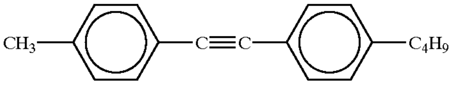
(B15)
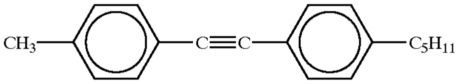
-continued
(B16)
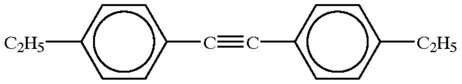
(B17)
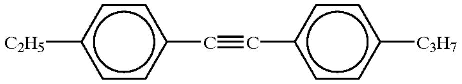
(B18)
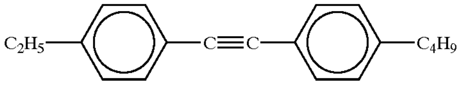
(B19)
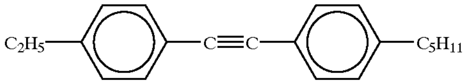
(B20)
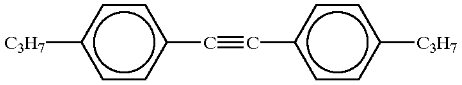
(B21)
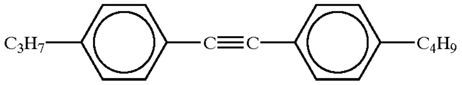
(B22)
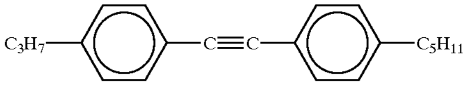
(B23)
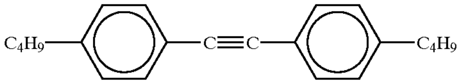
(B24)
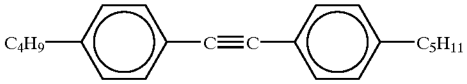
(B25)
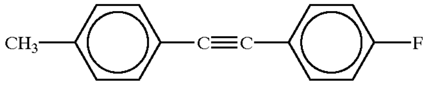
(B26)
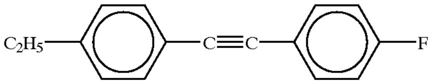
(B27)
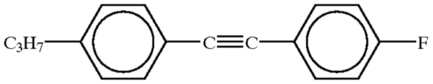
(B28)
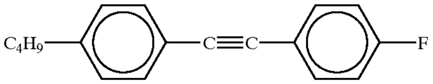
(B29)
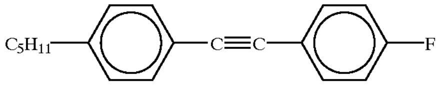
(B30)
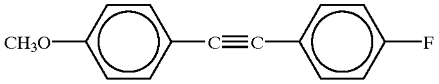
(B31)
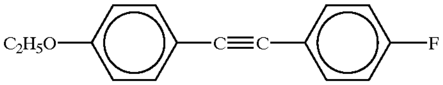

-continued
(B32)
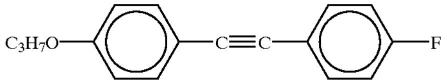
(B33)
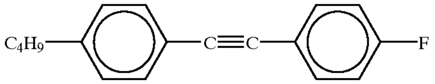
(B34)
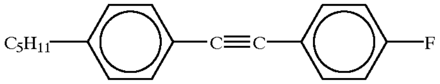
(B35)
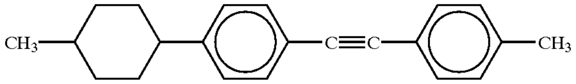
(B36)
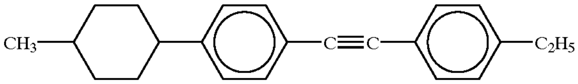
(B37)
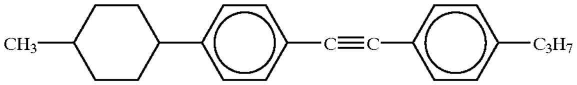
(B38)
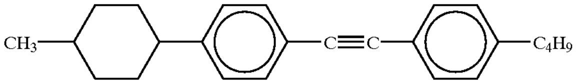
(B39)
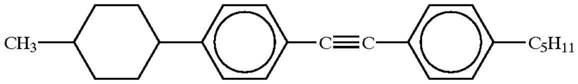
(B40)
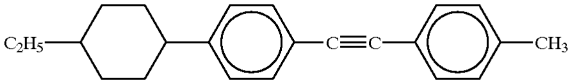
(B41)
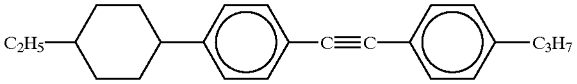
(B42)
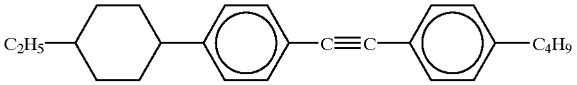
(B43)
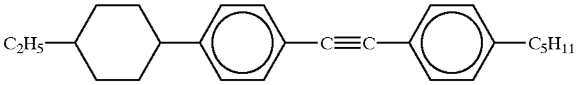
(B44)
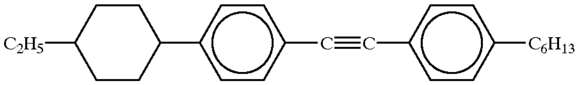
(B45)
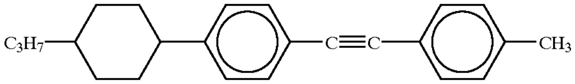
-continued
(B46)
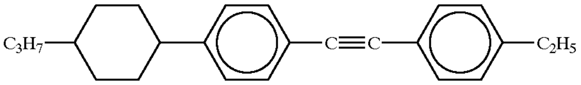
(B47)
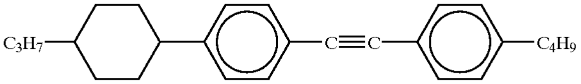
(B48)
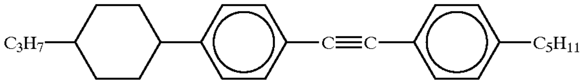
(B49)
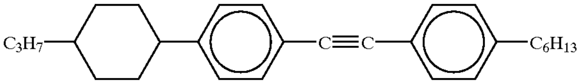
(B50)
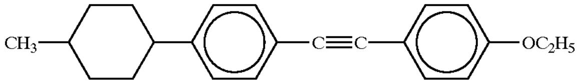
(B51)
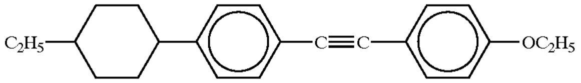
(B52)
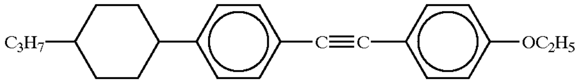
(B53)
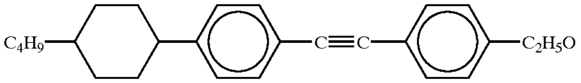
(B54)
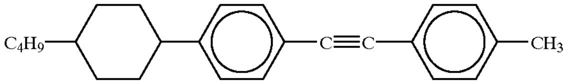
(B55)
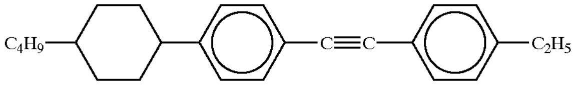
(B56)
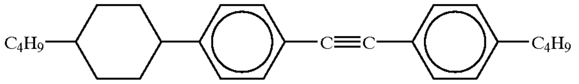
(B57)
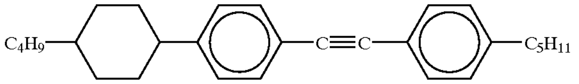
(B58)
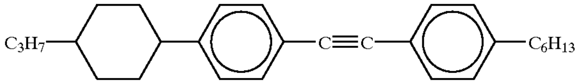

-continued (B59)

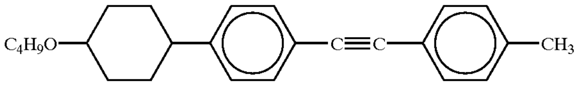

(B60)

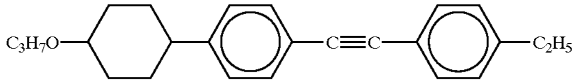

(B61)

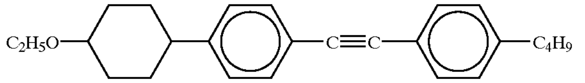

(B62)

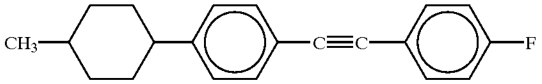

(B63)

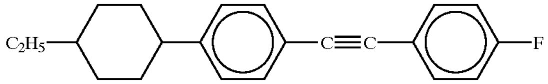

(B64)

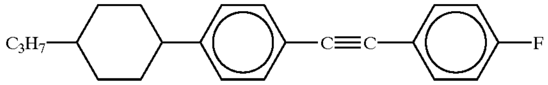

(B65)

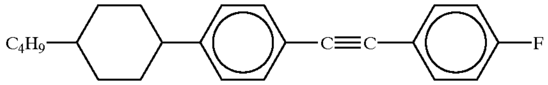

(B66)

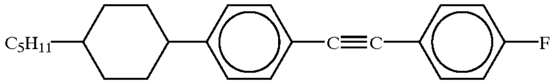

(B67)

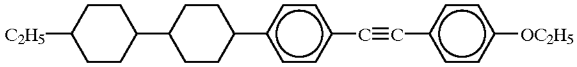

(B68)

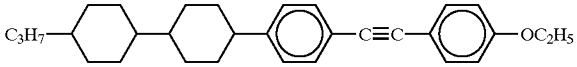

(B69)

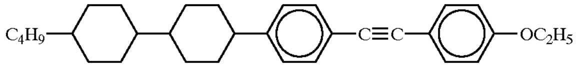

(B70)

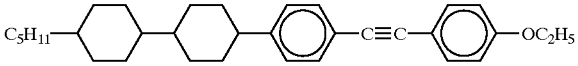

(B71)

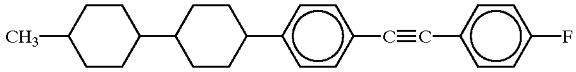

(B72)

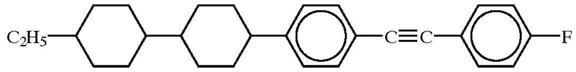

-continued (B73)

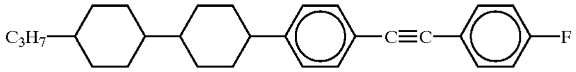

(B74)

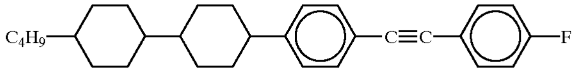

(B75)

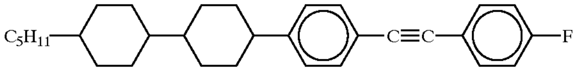

The liquid crystal tolan compound desirably includes a compound having a fluorine atom at its terminus. The nematic liquid crystal composition that constitutes structural material of the chiral nematic liquid crystal composition desirably contains 15 wt% or more liquid crystal tolan compound, and more desirably contains 20 wt% or more. The upper limit of the liquid crystal tolan compound content is 60 wt%, and is more desirably 50 wt%.

The total content of the liquid crystal ester compound and liquid crystal tolan compound is desirably 60 wt% or more of the nematic liquid crystal composition.

The composition desirably includes a liquid crystal tricyclic compound to improve the usable temperature range of the composition. When the liquid crystal tricyclic compound has a CN group, fluorine atom or the like, the dielectric anisotropy of the liquid crystal composition can be increased.

Examples (C1) through (C23) of usable liquid crystal tricyclic compounds are described below.

(C1)

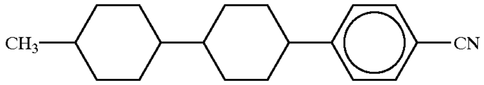

(C2)

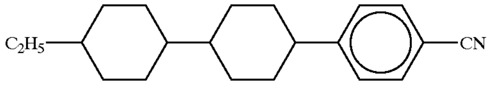

(C3)

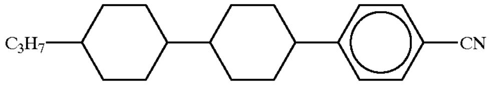

(C4)

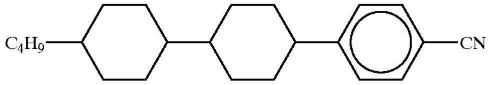

(C5)

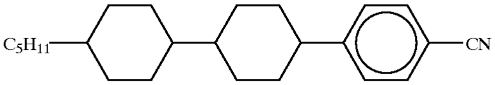

(C6)

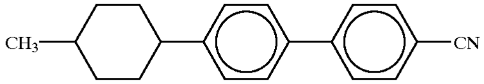

-continued (C7)

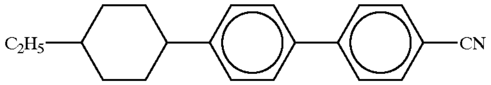

(C8)

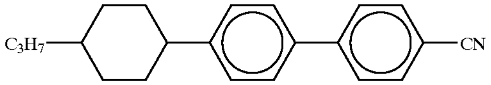

(C9)

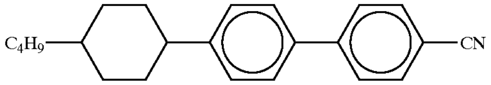

(C10)

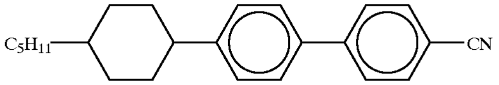

(C11)

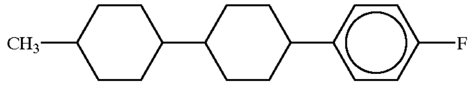

(C12)

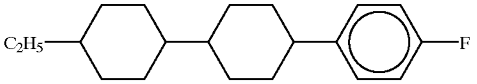

(C13)

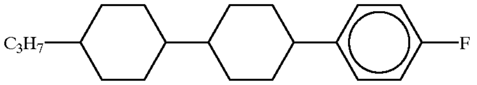

(C14)

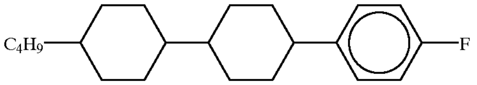

(C15)

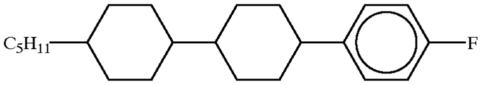

(C16)

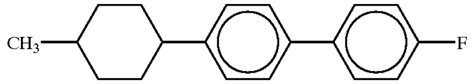

(C17)

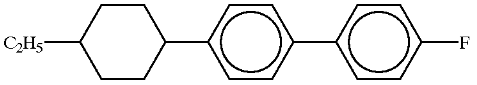

-continued (C18)

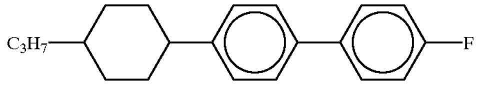

(C19)

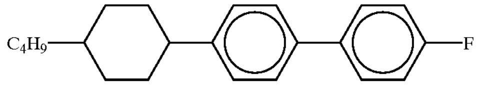

(C20)

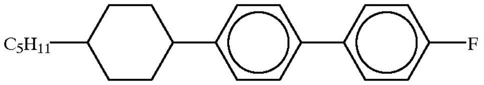

(C21)

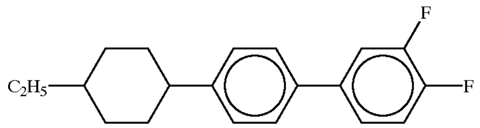

(C22)

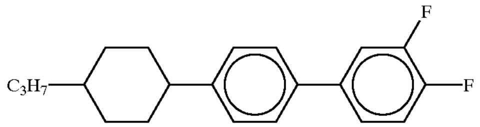

(C23)

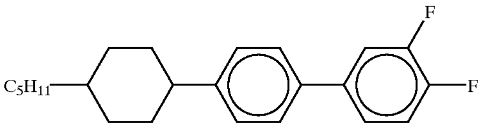

The nematic liquid crystal composition also may include other liquid crystal compounds. For example, a liquid crystal phenylcyclohexyl compound or a liquid crystal polycyclic compound which does not have a polar group may be included.

A usable chiral agent will have a stratified helical structure (molecular structure of the liquid crystal molecule rotated 360° along the helical structure of liquid crystal molecule) in the nematic liquid crystal molecule such as, for example, a biphenyl compound, terphenyl compound, ester compound, pyrimidine compound, azoxy compound and the like. Commercial chiral agents S811, 1CE2, CB15, R1011 (Merck and Co., Inc.) and the like having an optically active group as the terminal group of the compound may be used. Furthermore, a cholesteric liquid crystal compound having a cholesteric ring, of which cholesteric nonanolate is representative, may be used. Examples (D1) through (D6) are described below. The amount of added chiral agent may be approximately 10 wt% to approximately 45 wt% using the total weight of the nematic liquid crystal and chiral agent as a standard. When less than 10 wt% chiral agent is added, a desired selective reflection wavelength may not be realized, and when 45 wt% is exceeded, a cholesteric phase is not reached at room temperature, and the material may solidify.

(D1)

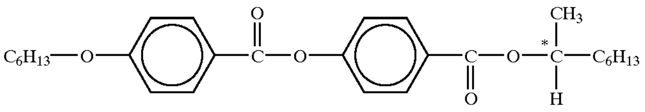

(D2)

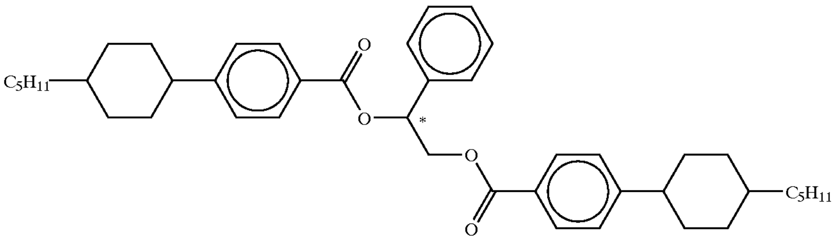

(D3)

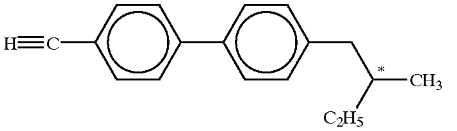

(D4)

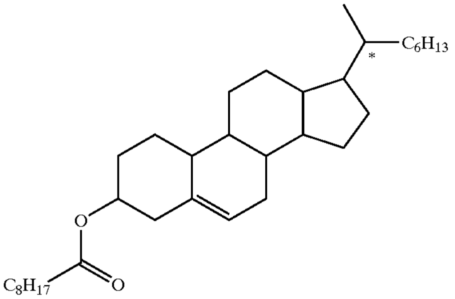

(D5)

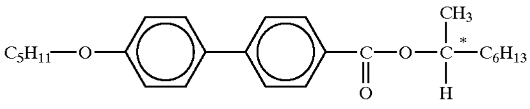

(D6)

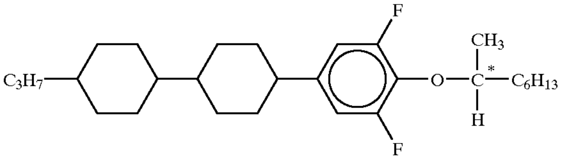

Various types of well known colorants may be used, such as azo compounds, quinone compounds, anthraquinone compounds and the like, or dichroic colorants and the like. The amount of the added colorant is 5 wt% or less, and desirably 3 wt% or less of the total weight of the nematic liquid crystal and the chiral agent.

An ultraviolet absorption agent prevents ultraviolet degradation of the liquid crystal composition, for example, fading color and changed responsiveness in conjunction with the passage of time. Usable materials include benzophenone compounds, benzotriazole compounds, salicylate compounds and the like. The amount of added ultraviolet absorption agent is 5 wt% or less, and desirably 3 wt% or less of the total weight of the nematic liquid crystal and the chiral agent.

The chiral nematic liquid crystal composition exhibits a cholesteric phase at room temperature, and desirably has refractive index anisotropy of in a range from 0.1 to 0.25, and more desirably in a range from 0.15 to 0.22. When the refractive index anisotropy of the composition is too small, there is concern that the dispersion components are too few, coloring is weakened in the planar state, and sufficient reflectivity is not obtained. Conversely, when the refractive index anisotropy is excessively large, there is a concern that the dispersion components become excessive, and the transparent/black display state in the focal-conic state is adversely affected (not transparent), so as to reduce the display performance. Accordingly, the refractive index anisotropy is desirably within the aforesaid range to ensure excellent display quality in the transparent state and the selective reflection color state, and produce sufficient contrast.

Even when the dielectric anisotropy of the liquid crystal composition is small, 9 or higher is desirable, and 15 or higher is more desirable. The upper limit is 40, and desirably less than 30. When the dielectric anisotropy is excessively large, there is concern about problems that may limit long-term reliability. Furthermore, when the dielectric anisotropy is less than 9, there is concern the drive voltage will become too high.

Columnar Structure

As to the columnar structure 20, first of all, a structural perspective are described. The columnar structure 20 may be, for example, a cylindrical column, square column, or oval column arranged at fixed spacing in a specific pattern such as a lattice sequence or the like. This columnar structure 20 is not disposed in a random arrangement, but rather has a specific layout pattern such as an equally-spaced layout, layout with gradually changing spacing, or a layout with periodically repeating specified patterns and the like. Prefereably, the layout maintains a suitable spacing between the substrates 11 and 12 and desirably does not obstruct the image display.

The method of forming the columnar structure is next described; the columnar structure may be formed by various conventional and well known methods. One exemplary method includes applying a photosetting resin material on a substrate, thereafter exposing the material to light of a specific wavelength through a mask formed with openings in a specific pattern so as to polymerize the photosetting resin material, and then removing the unnecessary parts. Another method involves screen printing a resin material. Methods of transferring, hardening and drying can be used. Yet another method involves forming a resin structure by applying a mixture of liquid crystal composition and photosetting resin material on substrate, thereafter overlaying another substrate, polymerizing the photosetting resin material by exposure to light of a specific wavelength through a mask formed with openings in a specific pattern, and then phase separating from the mixture to form a resin structure.

The liquid crystal display element may be formed by injecting a liquid crystal composition between substrates retained by the columnar structure via vacuum injection or the like.

Second Embodiment: Structure

Figure 2A:
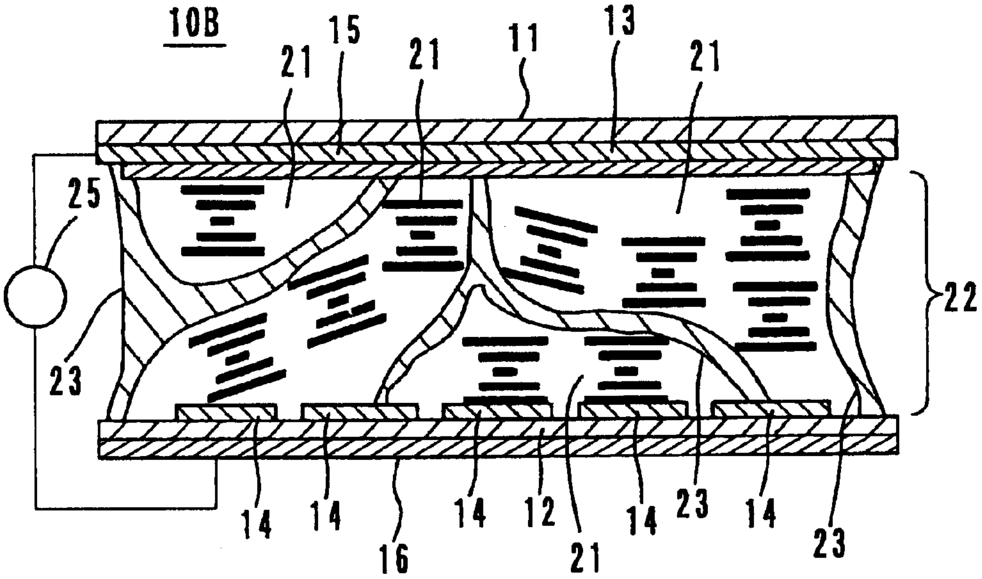
FIGS. 2(A) and (B) show the cross sectional structure of the liquid crystal element of a second embodiment of the present invention.
Figure 2B:
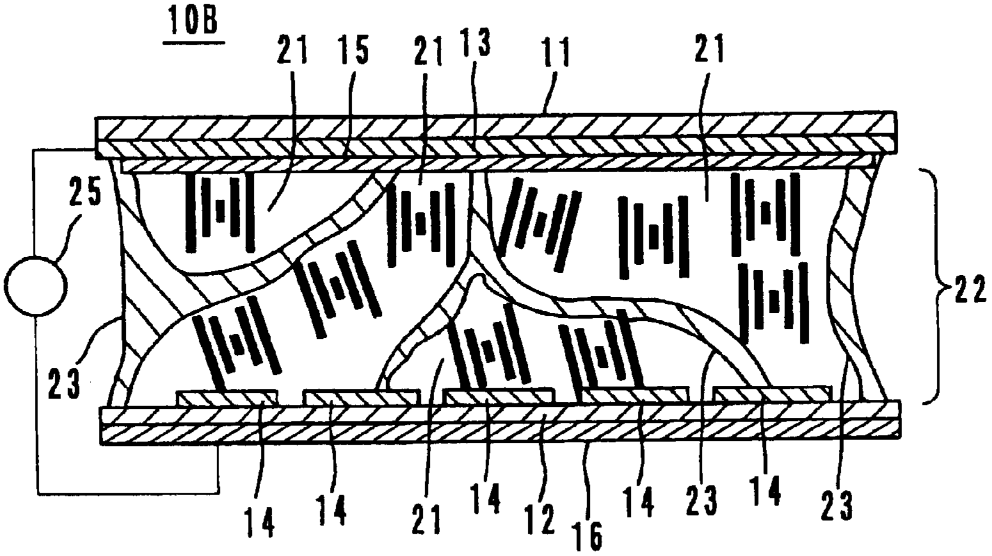

FIGS. 2(A) and (B) show the cross sectional structure of a liquid crystal display element 10B reflecting a second embodiment of the present invention. FIG. 2(A) shows the planar state (selective reflection color state) when a high voltage pulse is applied, and FIG. 2(B) shows the focal-conic state (transparent/black display state) when a low voltage pulse is applied. The planar state or the focal conic state is maintained even after the termination of the pulse voltage application similar to the first embodiment.

This liquid crystal display element is a resin network type formed of a composite layer 22 comprising a chiral nematic liquid crystal composition 21 and a three-dimensional reticular resin network 23. The composite layer 22 is produced by thoroughly mixing the liquid crystal composition and a resin material with added photopolymerization initiator, and thereafter polymerizing the resin material via exposure to ultraviolet light. The liquid crystal composition 21 may use the same material as the chiral nematic liquid crystal composition 21 described in the first embodiment. Other aspects are identical to those of the first embodiment, and are identified by the same reference numbers as in FIGS. 1(A), and 1(B).

Third Embodiment: Structure

Figure 3:
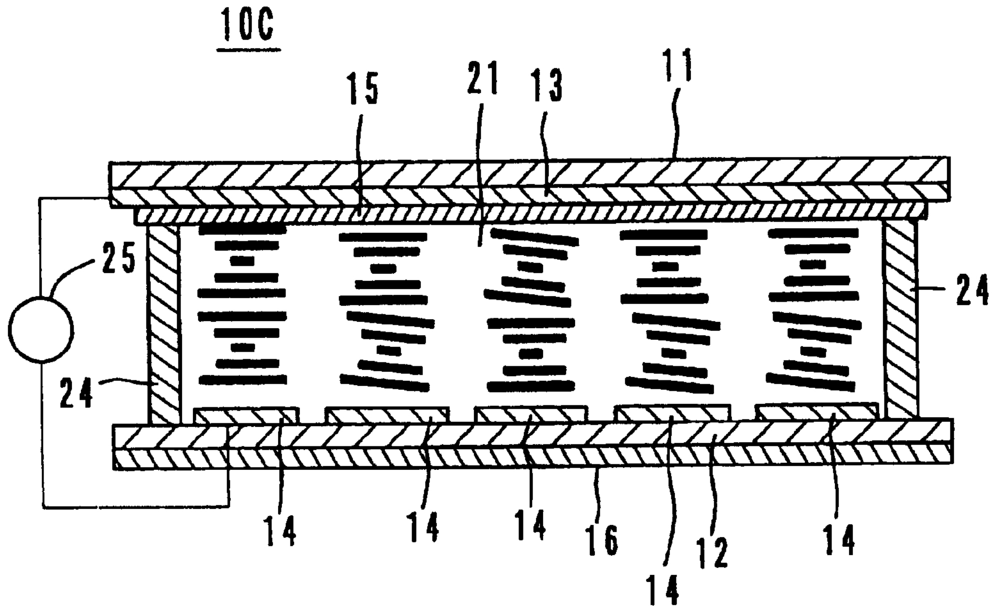
FIG. 3 shows the cross sectional structure of the liquid crystal element of a third embodiment of the present invention (planar state with application of high voltage pulse)

FIG. 3 shows the cross sectional structure of a liquid crystal display element 10C of a third embodiment of the present invention (planar state when a high voltage pulse is applied). This liquid crystal display element is basically identical to that of the first embodiment shown in FIGS. 1(A) and 1(B), except that the columnar structure is not provided within the display area. In FIG. 3, parts common to FIGS. 1(A) and 1(B) are identified by like reference numbers.

Fourth Embodiment: Structure

Figure 4:
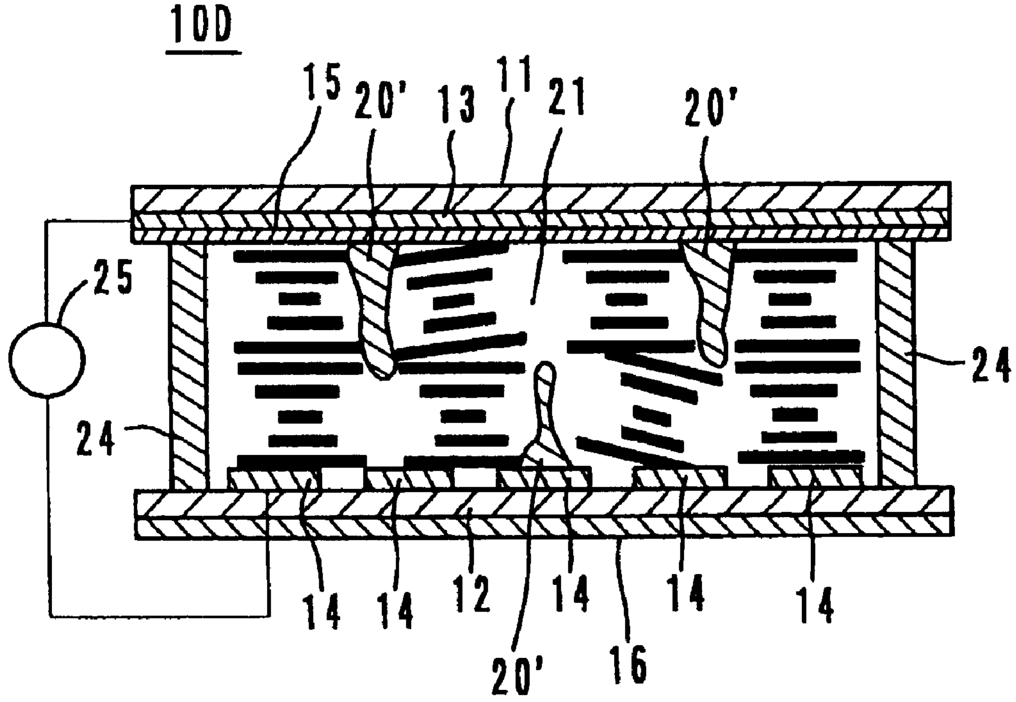
FIG. 4 shows the cross sectional structure of the liquid crystal element of a fourth embodiment of the present invention (planar state with application of high voltage pulse).

FIG. 4 shows the cross sectional structure of a liquid crystal display element 10D of a fourth embodiment of the present invention (planar state when a high voltage pulse is applied). This liquid crystal display element has a small columnar structure 20' extending to an intermediate area of the gap between the substrates 11 and 12 in the third embodiment shown in FIG. 3. In FIG. 4, parts common to FIGS. 1(A) and 1(B) are identified by like reference numbers.

Fifth Embodiment: Structure

The columnar structure is formed by a screen printing method in the liquid crystal display element shown in FIGS. 1(A) and 1(B). The screen printing method provides that a screen having a specific pattern formed thereon is placed over the electrode surface of the substrate, and a printing material (columnar structure composition) is applied on the screen. A squeegee is moved at a specific pressure and speed over the screen. In this way, the material is transferred onto the substrate through the screen. Then, the transferred material is hardened by heating, and dried.

When forming the columnar structure by the screen printing method, the resin material is not limited to photosetting resin, inasmuch as thermosetting resins and thermoplastics such as epoxy resin, acrylic resin and the like may be used. Examples of usable thermoplastic resins include polyvinylchloride resin, polyvinylidene chloride resin, polyvinyl acetate resin, polymethacrylate ester resin, polyacrylate ester resin, polystyrene resin, polyamide resin, polyethylene resin, polypropylene resin, fluororesin, polyurethane resin, polyacrylonitrile resin, polyvinyl pyrrolidone resin, saturated polyester resin, polycarbonate resin, chlorinated polyethylene resin and the like. The resin material is desirably dissolved in a suitable solvent and used as a paste.

After the resin material is arranged on the substrate, spacers are dispersed on at least one substrate, and the pair of substrates are overlaid with the surface bearing the plurality of band-like electrodes confronting one another to form hollow cells. The resin material is softened by heating while pressure is applied from both sides of the overlaid pair of substrates, and thereafter cooled and again solidified.

Specific examples are described below.

EXAMPLE 1

A nematic liquid crystal composition was used which comprised 45 wt% of liquid crystal ester compounds represented by structural formulas (A7), (A10), (A13), (A'7), and (A'10). and 18 wt% of liquid crystal tolan compounds represented by structural formulas (B3), (B9), (B12), (B54), and (B65). A chiral nematic liquid crystal composition exhibiting a selective reflection wavelength of 550 nm was produced by mixing 83.5 wt% of this nematic liquid crystal composition and 16.5 wt% chiral agent represented by structural formula (D3). This chiral nematic liquid crystal composition had a refractive index anisotropy $\Delta n$ of 0.154, dielectric anisotropy $\Delta\epsilon$ of 18.8, and phase transition point TNI to isotropic phase of 78.5° C.

Spacers were retained between glass substrates provided with electrodes to adjust the gap therebetween to 7 $\mu$m, and to retain the liquid crystal composition therebetween. A light absorption layer for black color was provided on the substrate on the side opposite the side at which light enters to produce a liquid crystal display element having the structure shown in FIG. 3.

This liquid crystal display element thus obtained exhibited a focal-conic state (transparent state) with a Y-value of 2.01 when a 30 V pulse voltage was applied for 5 msec between the electrodes. When a 50 V pulse voltage was applied for 5 msec, a planar state (green color state) was exhibited with a Y-value of 18.2. The contrast was 9.05, color purity under the planar state was 60.5%, and reflectivity under planar state was 31.6%.

The measurement of Y-value (luminous reflectance) and color purity (excitation purity), was accomplished using a spectral colorimeter model CM3700d using a white light source (Minolta Co., Ltd.). The same device was used in subsequent examples and comparative examples.

EXAMPLE 2

A nematic liquid crystal composition was used which comprised 42 wt% of liquid crystal ester compounds represented by structural formulas (A7), (A10), (A13), (A'7), and (A'10), and 28 wt% of liquid crystal tolan compounds represented by structural formulas (B3), (B9), (B12), (B54), (B55), (B63), and (B65). A chiral nematic liquid crystal composition exhibiting a selective reflection wavelength of 680 nm was produced by mixing 82.3 wt% of this nematic liquid crystal composition and 13.7 wt% of chiral agent represented by structural formula (D3). This chiral nematic liquid crystal composition had a refractive index anisotropy Δn of 0.188, dielectric anisotropy Δε of 20.8, and phase transition point $T_{NI}$ to isotropic phase of 84.5° C.

Spacers were retained between glass substrates provided with electrodes to adjust the gap therebetween to 9 μm, and to retain the liquid crystal composition therebetween. A light absorption layer for black color was provided on the substrate on the side opposite the side at which light enters to produce a liquid crystal display element having the structure shown in FIG. 3.

This liquid crystal display element exhibited a focal-conic state (transparent state) with a Y-value of 1.35 when a 35 V pulse voltage was applied for 5 msec between the electrodes. When a 55 V pulse voltage was applied for 5 msec, a planar state (red color state) was exhibited with a Y-value of 6.25. The contrast was 4.63, color purity under the planar state was 60.5%, and reflectivity under the planar state was 32.5%.

EXAMPLE 3

A nematic liquid crystal composition was used which comprised 40 wt% of liquid crystal ester compounds represented by structural formulas (A7), (A10), and (A'7), and 32 wt% of liquid crystal tolan compounds represented by structural formulas (B12), (B54), (B55), (B63), (B64), and (B65). A chiral nematic liquid crystal composition exhibiting a selective reflection wavelength of 490 nm was produced by mixing 78.6 wt% of this nematic liquid crystal composition and 21.4 wt% of chiral agent represented by structural formula (D6). This chiral nematic liquid crystal composition had a refractive index anisotropy An of 0.205, dielectric anisotropy Δε of 17.5, and phase transition point TNI to isotropic phase of 78.9° C.

Spacers were retained between glass substrates provided with electrodes to adjust the gap therebetween to 5 μm, and to retain the liquid crystal composition therebetween. A light absorption layer for black color was provided on the substrate on the side opposite the side at which light enters to produce a liquid crystal display element having the structure shown in FIG. 3.

This liquid crystal display element exhibited a focal-conic state (transparent state) with a Y-value of 1.85 when a 20 V pulse voltage was applied for 5 msec between the electrodes, and when a 40 V pulse voltage was applied for 5 msec, a planar state (blue color state) was exhibited with a Y-value of 7.97. The contrast was 4.30, color purity under the planar state was 65.1%, and reflectivity under the planar state was 31.3%.

EXAMPLE 4

A nematic liquid crystal composition was used which comprised 40 wt% of liquid crystal ester compounds represented by structural formulas (A7), (A10), and (A'7), and 32 wt% of liquid crystal tolan compounds represented by structural formulas (B12), (B54), (B55), (B63), (B64), and (B65). A chiral nematic liquid crystal composition exhibiting a selective reflection wavelength of 690 nm was produced by mixing 80.1 wt% of this nematic liquid crystal composition, 19.4 wt% of chiral agent represented by structural formula (D1), and 0.5 wt% dichroic colorant SI-426 (Mitsui Chemical Co., Ltd.). This chiral nematic liquid crystal composition had a refractive index anisotropy Δn of 0.215, dielectric anisotropy Δε of 15.4, and phase transition point $T_{NI}$ to isotropic phase of 79.5° C.

This liquid crystal composition was mixed with an ultraviolet-curing type monomer R684 (Nippon Kayaku Co., Ltd.) which included 5% polymerization initiator at a mixture ratio of 3:7, 9 μm spacers were provided between glass substrates on which electrodes were formed to maintain a gap therebetween while the material was exposed to ultraviolet light. A light absorption layer for black color was provided on the substrate on the side opposite the side at which light enters to produce a liquid crystal display element having the structure shown in FIG. 2.

This liquid crystal display element exhibited a focal-conic state (transparent state) with a Y-value of 1.25 when a 45 V pulse voltage was applied for 5 msec between the electrodes. When a 75 V pulse voltage was applied for 5 msec, a planar state (red color state) was exhibited with a Y-value of 6.22. The contrast was 4.98, color purity under the planar state was 76.2%, and reflectivity under the planar state was 33.6%.

EXAMPLE 5

A nematic liquid crystal composition was used which comprised 42 wt% of liquid crystal ester compounds represented by structural formulas (A7), (A10), (A13), (A'7), and (A'10), and 28 wt% of liquid crystal tolan compounds represented by structural formulas (B3), (B9), (B12), (B54), (B55), (B63), and (B65). A chiral nematic liquid crystal composition exhibiting a selective reflection wavelength of 550 nm was produced by mixing 79.2 wt% of this nematic liquid crystal composition, 20.5 wt% chiral agent represented by structural formula (D6), and 0.3% Kayaset yellow GN (Nippon Kayaku Co., Ltd.) as a colorant. This chiral nematic liquid crystal composition had a refractive index anisotropy Δn of 0.172, dielectric anisotropy Δε of 12.9, and phase transition point $T_{NI}$ to isotropic phase of 83.2° C.

This liquid crystal composition was mixed with an ultraviolet-curing type monomer R684 (Nippon Kayaku Co., Ltd.) which included 5% polymerization initiator at a mixture ratio of 3:7, 7 μm spacers were injected between glass substrates on which electrodes were formed to maintain a gap therebetween while the material was exposed to ultraviolet light. A light absorption layer for black color was provided on the substrate on the side opposite the side at which light enters to produce a liquid crystal display element having the structure shown in FIGS. 2(A) and 2(B).

This liquid crystal display element exhibited a focal-conic state (transparent state) with a Y-value of 2.05 when a 40 V pulse voltage was applied for 5 msec between the electrodes. When a 65 V pulse voltage was applied for 5 msec, a planar state (green color state) was exhibited with a Y-value of 20.8. The contrast was 10.0, color purity under the planar state was 76.6%, and reflectivity under the planar state was 32.5%.

EXAMPLE 6

A nematic liquid crystal composition was used which comprised 38 wt% of liquid crystal ester compounds represented by structural formulas (A25), (A27), (A'2), (A'3), and (A'5), and 26 wt% of liquid crystal tolan compounds represented by structural formulas (B3), (B9), (B12), (B55), (B63), and (B65). A chiral nematic liquid crystal composition exhibiting a selective reflection wavelength of 475 nm was produced by mixing 74.1 wt% of this nematic liquid crystal composition, 25.4 wt% chiral agent represented by structural formula (D6), and 0.5 wt% ultraviolet absorption agent T-175 (Nippon Kayaku Co., Ltd.). This chiral nematic liquid crystal composition had a refractive index anisotropy $\Delta n$ of 0.145, dielectric anisotropy $\Delta\epsilon$ of 19.8, and phase transition point $T_{NI}$ to isotropic phase of 81.1° C.

Spacers were retained between glass substrates provided with electrodes to adjust the gap therebetween to 5 $\mu$m, and to retain the liquid crystal composition therebetween. A light absorption layer for black color was provided on the substrate on the side opposite the side at which light enters to produce a liquid crystal display element having the structure shown in FIG. 3.

This liquid crystal display element exhibited a focal-conic state (transparent state) with a Y-value of 1.35 when a 25 V pulse voltage was applied for 5 msec between the electrodes. When a 40 V pulse voltage was applied for 5 msec, a planar state (blue color state) was exhibited with a Y-value of 7.04. The contrast was 5.21, color purity under the planar state was 68.2%, and reflectivity under the planar state was 30.2%.

EXAMPLE 7

A nematic liquid crystal composition comprising 42 wt% of liquid crystal ester compounds represented by structural formulas (A7), (A10), (A13), (A'7), and (A'10), and 28 wt% of liquid crystal tolan compounds represented by structural formulas (B3), (B9), (B12), (B54), (B55), (B63), and (B65) and nematic liquid crystal compound comprising 7 wt% of liquid crystal tricyclic compounds represented by the structural formulas (C2), (C3), and (C4) were used. A chiral nematic liquid crystal composition exhibiting a selective reflection wavelength of 550 nm was produced by mixing 22.5 wt% of this nematic liquid crystal composition and 17.5 wt% chiral agent represented by structural formula (D3). This chiral nematic liquid crystal composition had a refractive index anisotropy $\Delta n$ of 0.208, dielectric anisotropy $\Delta\epsilon$ of 22.6, and phase transition point $T_{NI}$ to isotropic phase of 82.1° C.

Spacers were retained between glass substrates provided with electrodes to adjust the gap therebetween to 7 $\mu$m, and to retain the liquid crystal composition therebetween. A light absorption layer for black color was provided on the substrate on the side opposite the side at which light enters to produce a liquid crystal display element having the structure shown in FIG. 3.

This liquid crystal display element exhibited a focal-conic state (transparent state) with a Y-value of 2.28 when a 20 V pulse voltage was applied for 5 msec between the electrodes. When a 40 V pulse voltage was applied for 5 msec, a planar state (green color state) was exhibited with a Y-value of 22.1. The contrast was 9.69, color purity under the planar state was 62.3%, and reflectivity under the planar state was 33.2%.

EXAMPLE 8

A nematic liquid crystal composition was used which comprised 25 wt% of liquid crystal ester compounds represented by structural formulas (A7), (A10), and (A'10), and 48 wt% of liquid crystal tolan compounds represented by structural formulas (B3), (B9), (B12), (B42), (B43), (B54), and (B65). A chiral nematic liquid crystal composition exhibiting a selective reflection wavelength of 550 nm was produced by mixing 80.5 wt% of this nematic liquid crystal composition and 19.5 wt% chiral agent represented by structural formula (D3). This chiral nematic liquid crystal composition bad a refractive index anisotropy $\Delta n$ of 0.189, dielectric anisotropy $\Delta\epsilon$ of 9.8, and phase transition point $T_{NI}$ to isotropic phase of 82.5° C.

Spacers were retained between glass substrates provided with electrodes to adjust the gap therebetween to 7 $\mu$m, and to retain the liquid crystal composition therebetween A light absorption layer for black color was provided on the substrate on the side opposite the side at which light enters to produce a liquid crystal display element having the structure shown in FIG. 3.

This liquid crystal display element exhibited a focal-conic state (transparent state) with a Y-value of 2.44 when a 50 V pulse voltage was applied for 5 msec between the electrodes. When an 80 V pulse voltage was applied for 5 msec, a planar state (green color state) was exhibited with a Y-value of 21.2. The contrast was 8.69, color purity under the planar state was 45.5%, and reflectivity under the planar state was 30.6%.

EXAMPLE 9

A nematic liquid crystal composition was used which comprised 45 wt% of liquid crystal ester compounds represented by structural formulae (A7), (A8), (A10), (A13), (A25) and (A28), and 25 wt% of liquid crystal tolan compounds represented by structural formulae (B3), (B9), (B12), (B54), (B55), (B63), and (B65). A chiral nematic liquid crystal composition exhibiting a selective reflection wavelength of 475 nm was produced by mixing 58.5 wt% of this nematic liquid crystal composition and 41.5 wt% chiral agent represented by structural formula (D3). This chiral nematic liquid crystal composition had a refractive index anisotropy $\Delta n$ of 0.178, dielectric anisotropy $\Delta\epsilon$ of 14.3, and phase transition point $T_{NI}$ to isotropic phase of 78.3° C.

Spacers were retained between polyethersulfone substrates provided with electrodes to adjust the gap therebetween to 5 $\mu$m, and to retain the chiral nematic liquid crystal composition therebetween. A light absorption layer for black color was provided on the substrate on the side opposite the side at which light enters to produce a liquid crystal display element having the structure shown in FIG. 3.

This liquid crystal display element exhibited a focal-conic state (transparent state) with a Y-value of 1.27 when a 20 V pulse voltage was applied for 5 msec between the electrodes. When a 40 V pulse voltage was applied for 5 msec, a planar state (blue color state) was exhibited with a Y-value of 7.95. The contrast was 6.26, color purity under the planar state was 67.9%, and reflectivity under the planar state was 30.5%.

EXAMPLE 10

A nematic liquid crystal composition was used which comprised 40 wt% of liquid crystal ester compounds represented by structural formulas (A7), (A8), (A10), (A13), (A25), (A28), (A61), (A63), (A69), (A71), (A73), and (A'5), and 20 wt% of liquid crystal tolan compounds represented by structural formulas (B3), (B9), (B12), (B42), (B54), and (B65). A chiral nematic liquid crystal composition exhibiting a selective reflection wavelength of 680 nm was produced by mixing 87.2 wt% of this nematic liquid crystal composition and 7.3 wt% chiral agent represented by structural formula (D2) and 5.5 wt% chiral agent represented by structural formula (D3). This chiral nematic liquid crystal composition had a refractive index anisotropy $\Delta n$ of 0.165, dielectric anisotropy $\Delta\epsilon$ of 28.6, and phase transition point $T_{NI}$ to isotropic phase of 81.4° C.

Spacers were retained between polyethersulfone substrates provided with electrodes to adjust the gap therebetween to 5 $\mu$m, and to retain the chiral nematic liquid crystal composition therebetween. A light absorption layer for black color was provided on the substrate on the side opposite the side at which light enters to produce a liquid crystal display element having the structure shown in FIG. 3.

This liquid crystal display element exhibited a focal-conic state (transparent state) with a Y-value of 2.44 when a 20 V pulse voltage was applied for 5 msec between the electrodes. When a 40 V pulse voltage was applied for 5 msec, a planar state (red color state) was exhibited with a Y-value of 6.92. The contrast was 5.41, color purity under the planar state was 62.5%, and reflectivity under the planar state was 32.5%.

Comparative Example 1

A nematic liquid crystal composition was used which comprised 45 wt% of liquid crystal tolan compounds represented by structural formulas (B12), (B13), (B14), (B15), and (B18), and 25 wt% of liquid crystal tricyclic compounds represented by the structural formulas (C18), (C19), (C21), (C22), and (C23), and did not include liquid crystal ester compound. A chiral nematic liquid crystal composition exhibiting a selective reflection wavelength of 690 nm was produced by mixing 83.9 wt% of this nematic liquid crystal composition, 15.6 wt% chiral agent represented by structural formula (D1), and 0.5 wt% dichroic colorant SI-426 (Mitsui Chemical Co., Ltd.). This chiral nematic liquid crystal composition had a refractive index anisotropy Δn of 0.174, dielectric anisotropy Δε of 5.8, and phase transition point $T_{NI}$ to isotropic phase of 75.1° C.

Spacers were retained between glass substrates provided with electrodes to adjust the gap therebetween to 9 μm, and to retain the liquid crystal composition therebetween. A light absorption layer for black color was provided on the substrate on the side opposite the side at which light enters to produce a liquid crystal display element having the structure shown in FIG. 3.

This liquid crystal display element exhibited a focal-conic state (transparent state) with a Y-value of 1.95 when a 60 V pulse voltage was applied for 5 msec between the electrodes. When a 110 V pulse voltage was applied for 5 msec, a planar state (red color state) was exhibited with a Y-value of 5.86. The contrast was 3.01, color purity under the planar state was 67.4%, and reflectivity under the planar state was 34.0%.

Comparative Example 2

A nematic liquid crystal composition was used which comprised 45 wt% liquid crystal tolan compounds represented by structural formulas (B12), (B13), (B14), (B15), and (B18), and 25 wt% liquid crystal tricyclic compounds represented by the structural formulas (C21), (C22), and (C23), but did not include liquid crystal ester compound. A chiral nematic liquid crystal composition exhibiting a selective reflection wavelength of 550 nm was produced by mixing 80.5 wt% of this nematic liquid crystal composition, and 19.5 wt% chiral agent represented by structural formula (D6). This chiral nematic liquid crystal composition had a refractive index anisotropy Δn of 0.168, dielectric anisotropy Δε of 7.4, and phase transition point $T_{NI}$ to isotropic phase of 73.6° C.

Spacers were retained between glass substrates provided with electrodes to adjust the gap therebetween to 7 μm, and to retain the liquid crystal composition therebetween. A light absorption layer for black color was provided on the substrate on the side opposite the side at which light enters to produce a liquid crystal display element having the structure shown in FIG. 3.

This liquid crystal display element exhibited a focal-conic state (transparent state) with a Y-value of 3.78 when a 70 V pulse voltage was applied for 5 msec between the electrodes. When a 120 V pulse voltage was applied for 5 msec, a planar state (green color state) was exhibited with a Y-value of 22.6. The contrast was 5.98, color purity under the planar state was 63.4%, and reflectivity under the planar state was 33.0%.

Comparative Example 3

A nematic liquid crystal composition was used which comprised 75 wt% liquid crystal ester compounds represented by the structural formulas (A5), (A11), (A13), (A'7), and (A'10), and the structural formulas (A"1), (A"2), (A"3), and (A"4), but did not include a liquid crystal tolan compound. A chiral nematic liquid crystal composition exhibiting a selective reflection wavelength of 550 nm was produced by mixing this nematic liquid crystal composition and chiral agent represented by the structural formula (D6), but this composition exhibited a smectic phase without exhibiting a cholesteric phase at room temperature.

(A"1)

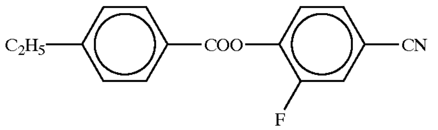

(A"2)

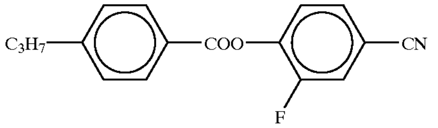

(A"3)

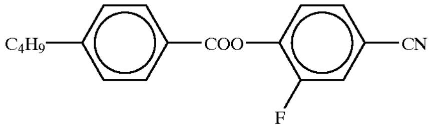

(A"4)

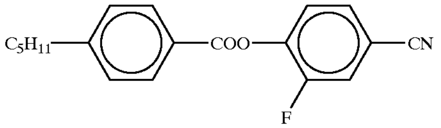

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A liquid crystal composition that exhibits a cholesteric phase, said liquid crystal composition comprising a nematic liquid crystal composition comprising:

at least one type of liquid crystal ester compound including an ester unit and at least two fluorine atoms therein; and at least one type of liquid crystal tolan compound including a tolan unit therein; and wherein said liquid crystal ester compound and said liquid crystal tolan compound are different.from each other; and a chiral agent having optical activity.

2. A liquid crystal composition as claimed in claim 1, wherein the chiral agent is. added to the nematic liquid crystal composition in an amount sufficient to effectively form a planer structure.

3. A liquid crystal composition as claimed in claim 2, wherein the chiral agent is added to the nematic liquid crystal composition in an amount sufficient to effectively form a focal-conic structure.

4. A liquid crystal composition .as claimed in claim 1, wherein the chiral agent is included in a range from 10 wt% to 45 wt% relative to the total weight of the nematic liquid crystal composition and chiral agent.

5. A liquid crystal composition as claimed in claim 1, wherein the nematic liquid crystal composition further comprises at least one type of liquid crystal tricyclic compound.

6. A liquid crystal composition as claimed in claim 5, wherein the at least one type of liquid crystal tricyclic compound has a cyano group at the terminus.

7. A liquid crystal composition as claimed in claim 1, wherein the total content of the at least one type of liquid crystal ester compound and the at least one type of liquid crystal tolan compound is at least 60 wt% relative to the nematic liquid crystal composition.

8. A liquid crystal composition as claimed in claim 1, wherein the at least one type of liquid crystal ester compound is at least 40 wt% relative to the nematic liquid-crystal composition.

9. A liquid crystal composition as claimed in claim 1, wherein the at least one type of liquid crystal ester compound has a cyano group at its terminus.

10. A liquid crystal composition as claimed in claim 1, wherein the at least one type of liquid crystal tolan compound is at least 10 wt% relative to the nematic liquid crystal composition.

11. A liquid crystal composition as claimed in claim 1, wherein the at least one type of liquid crystal tolan compound has at least one fluorine atom within its molecular structure.

12. A liquid crystal composition as claimed in claim 1, wherein a dielectric anisotropy of the liquid crystal composition is in a range from 10 to 30.

13. A liquid crystal composition as claimed in claim 12, wherein the dielectric anisotropy of the liquid crystal composition is in a range from 15 to 30.

14. A liquid crystal composition as claimed in claim 1, wherein a refractive index anisotropy of the liquid crystal composition is in a range from 0.1 to 0.25.

15. A liquid crystal composition as claimed in claim 1, wherein the refractive index anisotropy of the liquid crystal composition is in a range from 0.15 to 0.22.

16. A liquid crystal composition as claimed in claim 1, further comprising a colorant.

17. A liquid crystal display element comprising:

a pair of substrates at least one of which is transparent; and a liquid crystal layer retained between said substrates, said liquid crystal layer including a liquid crystal composition that exhibits a cholesteric phase, said liquid crystal composition comprising a nematic liquid crystal composition and a chiral agent, said nematic liquid crystal composition comprising:

at least one type of liquid crystal ester compound including an ester unit and at least two fluorine atoms therein; and at least one type of liquid crystal tolan compound including a tolan unit therein; and wherein said liquid crystal ester compound and said liquid crystal tolan compound are different from each other.

18. A liquid crystal display element as claimed in claim 17, wherein at least one of said substrates is flexible.

19. A liquid crystal display element as claimed in claim 17, wherein a plurality of electrodes is formed on each of said substrates.

20. A liquid crystal display element as claimed in claim 17, further comprising a light absorbing layer disposed on one of said substrates.

* * * * *